(12) United States Patent
Nanja et al.

(10) Patent No.: US 7,617,490 B2
(45) Date of Patent: Nov. 10, 2009

(54) METHODS AND APPARATUS FOR DYNAMIC BEST FIT COMPILATION OF MIXED MODE INSTRUCTIONS

(75) Inventors: Murthi Nanja, Portland, OR (US); Zhiguo Gao, Beijing (CN); Joel D. Munter, Chandler, AZ (US); Jin J. Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 10/659,457

(22) Filed: Sep. 10, 2003

(65) Prior Publication Data

US 2005/0055677 A1    Mar. 10, 2005

(51) Int. Cl.
*G06F 9/45* (2006.01)
(52) U.S. Cl. .................... 717/140; 717/145; 717/151
(58) Field of Classification Search .................. 717/136
See application file for complete search history.

(56) References Cited

U.S. PATENT DOCUMENTS

| | | | |
|---|---|---|---|
| 6,345,384 B1 * | 2/2002 | Sato ........................... | 717/160 |
| 6,530,075 B1 * | 3/2003 | Beadle et al. ............... | 717/114 |
| 6,684,390 B1 * | 1/2004 | Goff ............................ | 717/148 |
| 7,013,456 B1 * | 3/2006 | Van Dyke et al. ........... | 717/130 |
| 7,356,673 B2 * | 4/2008 | Altman et al. ................ | 712/43 |
| 2002/0100030 A1 * | 7/2002 | Souloglou et al. ........... | 717/146 |
| 2004/0054994 A1 * | 3/2004 | Demsey et al. .............. | 717/148 |
| 2004/0123278 A1 * | 6/2004 | Nanja et al. ................. | 717/153 |
| 2004/0158813 A1 * | 8/2004 | Xia et al. ..................... | 717/116 |
| 2004/0168028 A1 * | 8/2004 | Cierniak ...................... | 711/125 |

FOREIGN PATENT DOCUMENTS

JP    2000-181724    6/2000

OTHER PUBLICATIONS

"Mixed-Width Instruction Sets", Krishnaswamy et al., Jul. 2003, pp. 47-52. Online retrieved at <http://delivery.acm.org/10.1145/860000/859697/p47-krishnaswamy.pdf>.*

"Thumb: Reducing the Cost of 32-bit RISC Performance in Portable and Consumer Applications", Goudge et al., Feb. 1996, pp. 176-181. Online retrieved at <http://ieeexplore.ieee.org/stamp/stamp.jsp?tp=&arnumber=501765>.*

(Continued)

*Primary Examiner*—Tuan Q Dam
*Assistant Examiner*—Thuy Dao
(74) *Attorney, Agent, or Firm*—Hanley, Flight & Zimmerman, LLC

(57) ABSTRACT

Methods and an apparatus for dynamic best fit compilation of mixed mode instructions are provided. In one embodiment, a provided method includes receiving a non-native software instruction at a device, generating a first native software instruction from a first instruction set based on the non-native software instruction, the generation of the first native software instruction occurring at the device, executing the first native software instruction at the device, generating a second native software instruction from a second instruction set based on the non-native software instruction, the generation of the second native software instruction occurring at the device, and executing the second native software instruction at the device.

28 Claims, 5 Drawing Sheets

OTHER PUBLICATIONS

Submitted herewith is a copy of the International Preliminary Report on Patentability for International application No. PCT/US2004/029083 dated Mar. 23, 2006.

*International Search Report for International Patent Application Serial* No. PCT/US2004/029083; mailed Feb. 7, 2005; 4 pages.

*Written Opinion of the International Searching Authority for International Patent Application Serial* No. PCT/US2004/029083; mailed Feb. 7, 2005; 7 pages.

Krishnaswamy et al., "*Profile Guided Selection of ARM and Thumb Instructions*," Sigplan Notices ACM USA, vol. 37, No. 7, Jul. 2002; pp. 56-64.

Krishnaswamy et al., "*Mixed-Width Instructions Sets*," Communications of the Association for Computing Machinery, Association for Computing Machinary, New York, vol. 46, No. 8, Aug. 2003; pp. 47-52.

Fischer et al., "*Optimal Mixing of 16 bit and 32-bit computer codes by means of "Codebalance",*", Electronik Weka-Fachzeitscriften Germany, vol. 48, No. 19, Sep. 21, 1999; pp. 96-99.

Halambi et al., "*An Efficient Compiler Technique for Code Size Reduction Using Reduced Bit-Width ISAs*", Proceedings 2002 Design, Automations and Test in Europe Conference and Exhibition IEEE Computer Society, Los Alamitos, California, Mar. 2002; pp. 402-408.

Delsart et al., "*JCOD: a Lightweight Modular Compilation Technology for Embedded Java*", Lecture Notes in Computer Science, Springer Verlag, New York, New York, vol. 2491, Oct. 2002; pp. 197-212.

Clark D: "*Mobile Processors Begin to Grow Up*", Computer IEEE Computer Society USA, vol. 35, No. 3, Mar. 2002; pp. 22-25.

Office Action issued by the Patent Office of the People's Republic of China on Nov. 9, 2007; corresponding to Chinese patent application No. 200480025747.7; English translation included; 15 total pages.

\* cited by examiner

METHODS AND APPARATUS FOR DYNAMIC BEST FIT COMPILATION OF MIXED MODE INSTRUCTIONS

TECHNICAL FIELD

The present disclosure pertains to mixed mode computer instructions and, more particularly, to methods and apparatus for dynamic best fit compilation of mixed mode computer instructions.

BACKGROUND

Embedded systems (e.g., wireless communication devices, wireless data devices, etc.) are in ever growing demand. The types of resources available on embedded systems vary greatly in terms of static and dynamic memory, processing power, display size, battery life, input/output capabilities, etc. Accordingly, there is very little convergence of hardware and software on embedded systems.

As is known to those having ordinary skills in the art, there are many benefits to developing an embedded system using an intermediate language (IL), such as Java, C#, etc., rather than a natively compiled language (e.g., the C programming language). First, porting intermediate language modules to multiple platforms is possible without modifications to the source code unlike with most compiled languages. Second, intermediate languages and their runtime environments often have bug eliminating features such as array bounds checking, automatic garbage collection, and built-in exception-handling, that many compiled languages do not have. Third, intermediate languages typically run quicker than a totally interpreted language.

Realizing the foregoing advantages of intermediate languages, embedded systems are slowly migrating toward intermediate languages operating on runtime environments. As application software derives greater value from runtime environments, it's expected that many future applications will be written using an intermediate language.

One of the most prohibitive factors of using intermediate languages on embedded systems is the speed of execution. While intermediate languages typically operate quicker than interpreted languages, intermediate languages are usually slower than natively compiled languages. For example, intermediate languages such as Java may be up to three or four times slower than natively compiled languages such as C.

One technique for speeding up intermediate language instructions comprises generating native instructions from some of the intermediate language instructions. Typically, only the most frequently used code paths are compiled into native code, and the rest of the code is left as intermediate instructions. While this prior art technique may improve performance, generating native instructions from some of the intermediate language instructions only utilizes a single instruction set of a processor.

Mixed mode processors such as an ARM (previously, the Advanced RISC (Reduced Instruction Set Computer), and prior to that the Acorn RISC Machine, and now simply ARM) compliant processor, have two or more instruction sets such as, for example, a 16-bit instruction set (the Thumb instruction set) and a 32-bit instruction set (the ARM instruction set). Each of these instruction sets has advantages and disadvantages based on how the instruction sets are utilized. For example, the 16-bit Thumb instruction set typically encodes the functionality of the 32-bit ARM instruction in half the number of bits, thereby creating higher code density. An ARM instruction, however, typically has more semantic content than does a Thumb instruction. As is known to those having ordinary skills in the art, this means that an operation implemented with Thumb instructions may require more instructions to perform the equivalent operation implemented with ARM instructions (e.g., 40% more instructions). For example, to use a 16-bit immediate data location, the Thumb instruction set would require two more instructions to move the data into a register than would the ARM instruction set.

Depending on the memory configuration of a system, the ARM code may run significantly faster than the corresponding Thumb code does or vice-versa. For example, it has been estimated that with 32-bit memory, ARM code will run 40% faster than the corresponding Thumb code. However, with 16-bit memory, Thumb code may run 45% faster than the corresponding ARM code. Accordingly, with such large differences in speed and storage characteristics based on individual embedded systems configurations, there is a significant drawback to compiling intermediate language exclusively into one instruction set (e.g., the ARM instruction set). In addition, there is a significant drawback to not compiling all intermediate language instructions into native instructions.

DETAILED DESCRIPTION

In general, the methods and apparatus described herein dynamically compile mixed mode instructions (i.e., dynamic best fit compilation of mixed mode instructions). Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure is made with respect to example dynamic compilation systems, it should be understood that many other dynamic compilation systems are readily applicable to the disclosed system. Accordingly, while the following describes example systems and processes, persons of ordinary skill in the art will readily appreciate that the disclosed examples are not the only way to implement such systems. For example, instruction sets other than 16-bit instruction sets and 32-bit instruction sets may be used.

Figure 1:
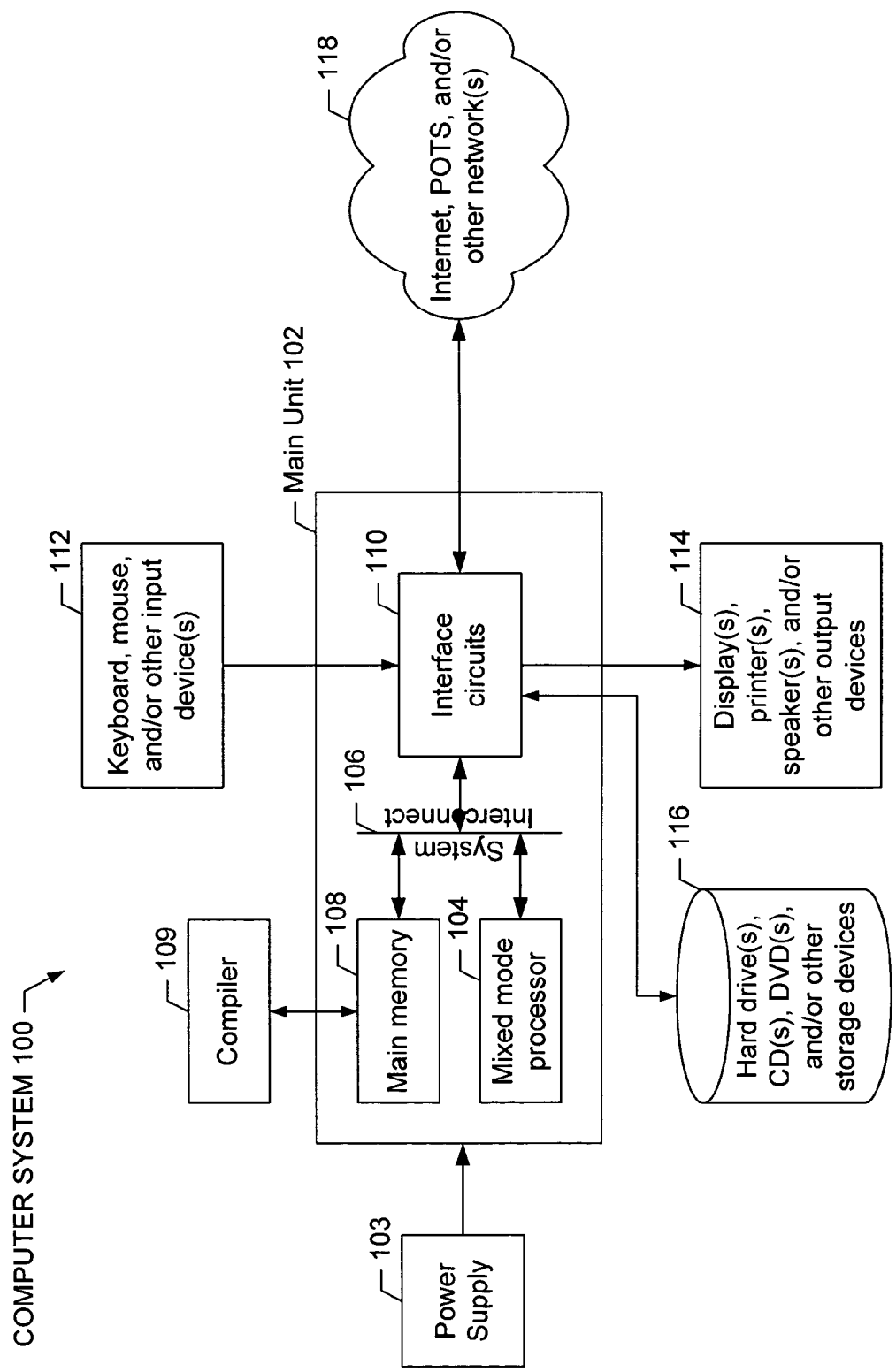
FIG. 1 is a block diagram of an example computer system illustrating an environment of use for the disclosed system.

A block diagram of an example computer system 100 is illustrated in FIG. 1. The computer system 100 may be a personal computer (PC), a personal digital assistant (PDA), an Internet appliance, a cellular telephone, or any other computing device. In one example, the computer system 100 includes a main processing unit 102 powered by a power supply 103. The main processing unit 102 may include a mixed mode processor unit 104 electrically coupled by a system interconnect 106 to a main memory device 108 and to one or more interface circuits 110. In one example, the system interconnect 106 is an address/data bus. Of course, a person of ordinary skill in the art will readily appreciate that interconnects other than busses may be used to connect the mixed mode processor unit 104 to the main memory device 108. For example, one or more dedicated lines and/or a crossbar may be used to connect the mixed mode processor unit 104 to the main memory device 108.

The mixed mode processor 104 may include any type of well-known mixed mode processor, such as a processor from the Intel® XScale™ family of processors and the Intel® Internet Exchange Processor (IXP) family of processors. Alternatively, the mixed mode processor 104 may be implemented by two or more single instruction set processors. For example, a hybrid Intel® Pentium® processor and Intel® Itanium® processor system may be used. In addition, the mixed mode processor 104 may include any type of well-known cache memory, such as static random access memory (SRAM). The main memory device 108 may include dynamic random access memory (DRAM) and/or any other form of random access memory. For example, the main memory device 108 may include double data rate random access memory (DDRAM). The main memory device 108 may also include non-volatile memory. In one example, the main memory device 108 stores a software program which is executed by the mixed mode processor 104 in a well known manner. The main memory device 108 may store a compiler program 111 for execution by the mixed mode processor 104.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. For example, the input device 112 may be a keyboard, a mouse, a touch screen, a track pad, a track ball, an isopoint, and/or a voice recognition system.

One or more displays, printers, speakers, and/or other output devices 114 may also be connected to the main processing unit 102 via one or more of the interface circuits 110. The display 114 may be a cathode ray tube (CRT), a liquid crystal displays (LCD), or any other type of display. The display 114 may generate visual indications of data generated during operation of the main processing unit 102. The visual indications may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or other computer media input/output (I/O) devices.

The computer system 100 may also exchange data with other devices via a connection to a network 118. The connection to the network 118 may be any type of network connection, such as an Ethernet connection, a digital subscriber line (DSL), a telephone line, a coaxial cable, etc. The network 118 may be any type of network, such as the Internet, a telephone network, a cable network, and/or a wireless network.

Figure 2:
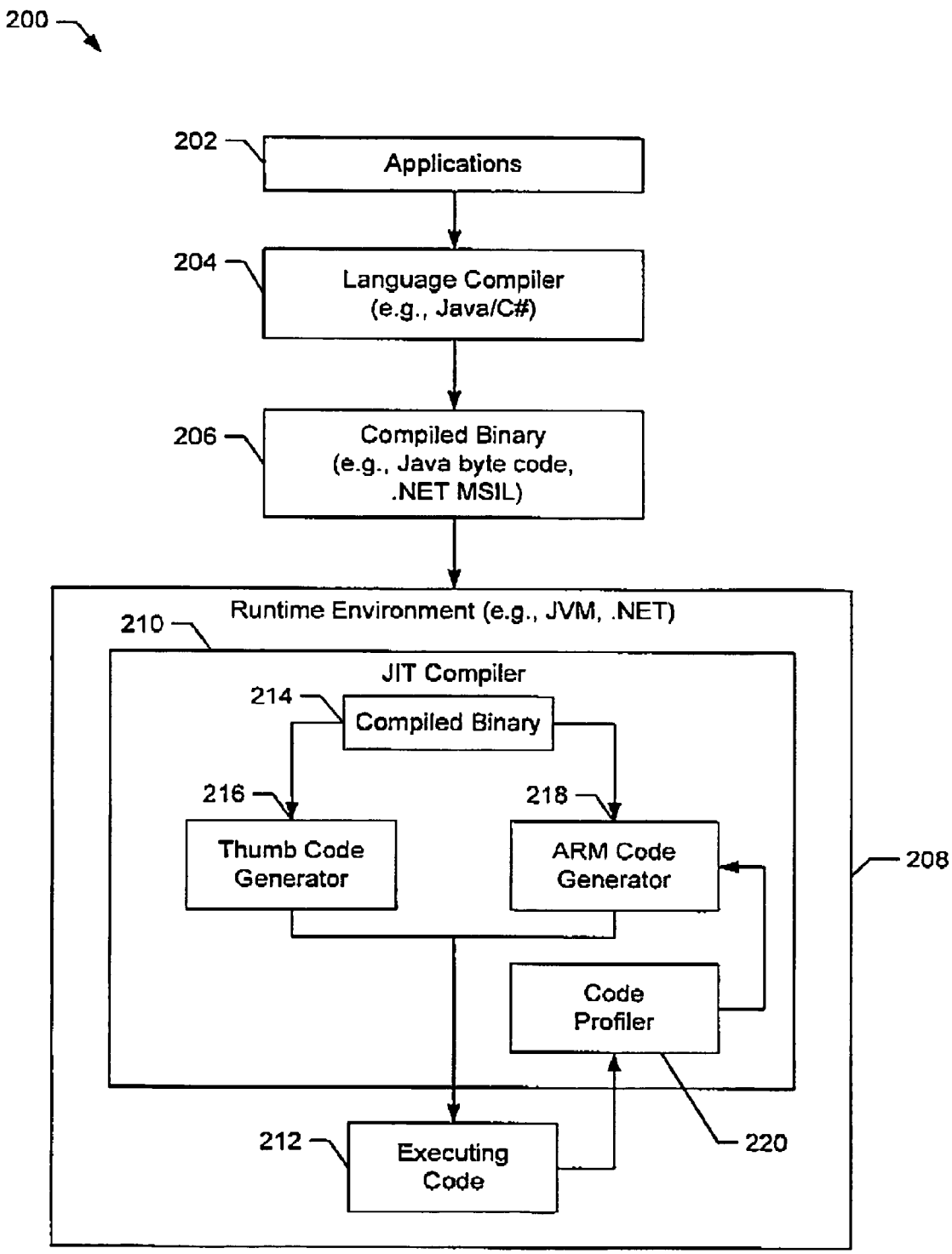
FIG. 2 is a block diagram illustrating an example usage of a dynamic best fit compilation of mixed mode instructions system that may be carried out by the computing system of FIG. 1.

In general, the block diagram in FIG. 2 illustrates an example usage of a dynamic best fit compilation of mixed mode instructions system 200. The mixed mode instructions system 200 comprises a plurality of applications 202, a language compiler 204, a compiled binary 206, and a runtime environment 208.

The plurality of applications 202 may include a Java source file, a C# source file, etc. Furthermore, the plurality of applications 202 may include a source file from a programming language that is not commonly associated with virtual machine compiled languages, such as Perl, Python, Jython, etc.

The plurality of applications 202 are compiled by the language compiler 204. Examples of the language compiler 204 may be a Java compiler, a C# compiler, a J# compiler, a Visual Basic .NET compiler, a Visual C++ .NET compiler, etc. The language compiler 204 translates a computer program written in a higher-level symbolic language (e.g., the plurality of applications 202) into intermediate language instructions (i.e., non-native instructions).

The output of the language compiler 204 (i.e., the non-native instructions) is stored in the compiled binary 206 that may be, for example; Java byte code, .NET Microsoft Intermediate Language (MSIL) Perl byte code, etc. The compiled binary 206 comprises a plurality of non-native instructions that is in a format that the runtime environment may load, compile to native instructions, and then execute.

For example, if the compiled binary 206 is Java byte code the compiled binary 206 comprises a sequence of Java instructions. Each individual Java instruction of the sequence of Java instructions is a one byte opcode followed by zero or more operands. The one byte opcode is an operation for the runtime environment 208 (i.e., a Java virtual machine) to use. The operand is a value to be used by the operation of the opcode. For example, a Java byte code may contain the following hexadecimal formatted sequence of bytes "84 01 02". The runtime environment 208 may interpret "84" to mean "iinc," which is an operation to increment a local variable. In this case the operand "01" indicates which local variable to be incremented, by an integer value, in this case the operand "02" indicates the decimal value 2.

The runtime environment 208 may be a Java virtual machine, a .NET common language runtime (CLR), a Perl virtual machine (e.g., Parrot), etc. The runtime environment 208 includes a just-in-time (JIT) compiler 210 and an executing code 212. The compiled binary 206 may be loaded into the JIT compiler 210 to form a copy of the compiled binary 206 in a JIT memory location, which may be stored in the main memory device 108 in FIG. 1. Once the copy of the compiled binary 206 in the JIT memory locution has been loaded into main memory 108, the ITT compiler 210 may act upon the non-native instructions stored therein. For example, the non-native instructions may be acted upon by the JIT compiler 210 by generating the non-native instructions into native Thumb instructions by a Thumb code generator 216 or by generating the non-native instructions into native ARM instructions by an ARM code generator 218. The Thumb code generator 216 and the ARM code generator 218 may be components of the JIT compiler 210 that generate 16-bit instruction set code and 32-bit instruction set code respectively.

As is known to those having ordinary skills in the art, methods exist to translate such a non-native instruction into a native instruction. For example, Insignia Solutions provides a Java based runtime environment known as the Jeode Platform. The Jeode Platform makes use of an interpreter for rarely used code paths and a JIT compiler for frequently executed code paths. The JIT compiler of the Jeode Platform is capable of translating non-native instructions into one or more ARM instructions. The JIT compiler of the Jeode Platform does not, however, take advantage of mixed mode instruction generation, but instead only uses one instruction set. The ARM code generator may implement one of these well known methods. Alternatively or additionally, the ARM instruction may be translated from the Thumb instruction rather than from the non-native instruction. For example, the ARM Development Suite (ADS) comprises a compiler and an assembler that can translate from a source file into either an ARM instruction or a Thumb instruction. The Thumb code generator 216 may translate the non-native instruction into a native instruction in a similar manner.

Furthermore, the JIT compiler 210 includes a code profiler 220 that may store operational data pertinent to the generation and execution of non-native and native instructions. Additionally or alternatively, the code profiler 220 may be located outside of the JIT compiler 210. Further details of how and when the mixed mode generation is achieved are described in conjunction with FIG. 3.

Figure 3:
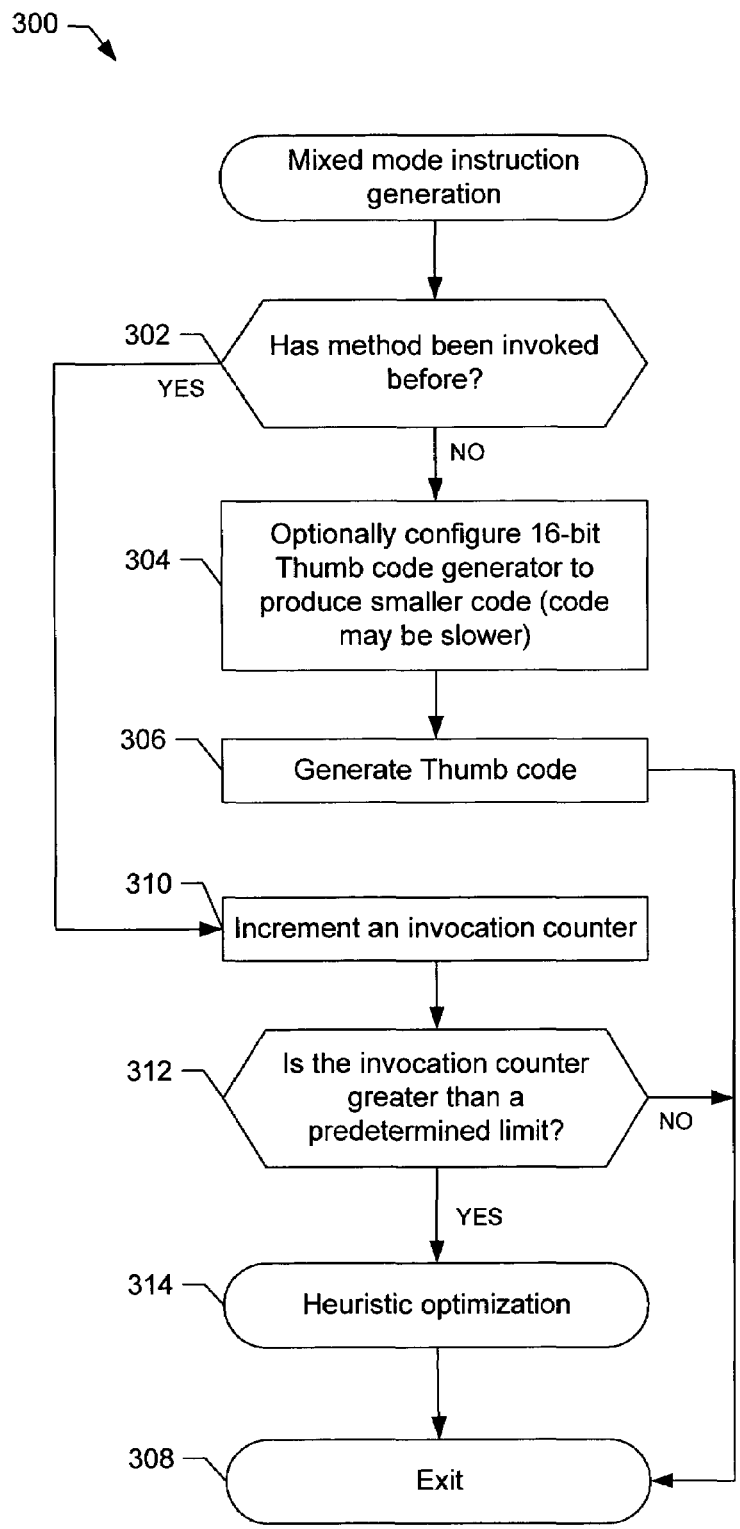
FIG. 3 is a flowchart illustrating an example process for dynamically compiling mixed mode instructions that may be carried out by the computing system of FIG. 1

In general, the example process 300 of FIG. 3 dynamically compiles instructions located on the main processing unit 102 of FIG. 1, although the instructions may have originated from the internet, the plain old telephone system (POTS), and/or other network(s) 118 of FIG. 1 or from die hard drive(s), CD(s), DVD(s), and/or other storage devices 116 of FIG. 1. More specifically, the example process 300 may operate in the JIT compiler 210 of FTC. 2. Preferably, the process 300 is embodied in one or more software programs which are stored in one or more memories and executed by one or more processors in a well known manner. However, some or all of the blocks of the process 300 may be performed manually. Although the process 300 is described with reference to the flowchart illustrated in FIG. 3, a person or ordinary skill in the art will readily appreciate that many other methods of performing the process 300 may be used. For example, the order of many of the blocks may be altered, the operation of one or more blocks may be changed, blocks may be combined, and/or blocks may be eliminated.

The example process 300 begins by determining if a method has been previously invoked (block 302). One example implementation may check if the Thumb instructions for the method already exist. If the Thumb instructions for the method already exist, it may be determined that the method has been previously invoked.

If the method has not been previously invoked (block 302), the 16-bit Thumb code generator 216 of FIG. 2 may be optionally configured to produce smaller Thumb code than would have otherwise been generated by the Thumb code generator 216 (block 304). One advantage of smaller code is a potential to reduce the memory size of the computer system 100 of FIG. 1 resulting in less expensive products comprising potentially fewer and more limited resources. While the configuring of the 16-bit Thumb code generator 216 is explained here as having only two levels, an enabled level and a disabled level, those having ordinary skill in the art realize that various levels of configuration may be defined.

After optionally configuring the 16-bit Thumb code generator 216 (block 304), a Thumb instruction is generated (block 306) and the example process 300 exits (block 308). The Thumb instruction may be generated by the Thumb code generator 216 of FIG. 2. The Thumb code generator 216 creates the Thumb instruction by translating a non-native instruction into a native instruction. It is prudent to generate the Thumb instruction upon first invocation because of the positive characteristics of Thumb code. For example, Thumb code typically takes less memory space than ARM code does, but ARM code may be faster than Thumb code. Accordingly, it is advantageous to generate an instruction that is invoked the most frequently into an ARM instruction and an instruction that runs less frequently into a Thumb instruction, which has better memory space characteristics. At this point in the process 300, the frequency of invocation of the instruction is not yet known, and so the instruction is translated into the Thumb instruction.

Conversely, if the method has been invoked before (block 302), an invocation counter associated with the currently executed method is incremented (block 310). The invocation counter may be a variable stored in the code profiler 220 of FIG. 2 representing the number of times that the above mentioned method has been invoked. One example implementation may insert an invocation counting instruction within a generated native Thumb or ARM method. The invocation counting instruction may increment the invocation counter as a global variable. The invocation counter may be located within the code profiler 220 of FIG. 2. Alternatively, the invocation counting instruction may invoke a method that increments the invocation counter as a variable having local scope within the code profiler 220 of FIG. 2 that represents the number of times that the above mentioned method has been invoked. If the variable is equal to zero, the process 300 may determine that the method has not been previously invoked, otherwise this process 300 may determine that the method has been previously invoked.

After the invocation counter associated with the currently executed method has been incremented (block 310), the example process 300 determines if the invocation counter is greater than a predetermined limit (block 312). If the invocation counter is not greater than a predetermined limit (block 312), the Thumb code already exists and thus does not need to be regenerated. As a result, the example process 300 exits (block 308).

Conversely, if the invocation counter is greater than a predetermined limit (block 312), a heuristic optimization process is invoked (block 314). The heuristic optimization process is explained in greater detail in conjunction with FIG. 4. After the heuristic optimization process has returned control (block 314), the example process 300 exits (block 308).

Figure 4:
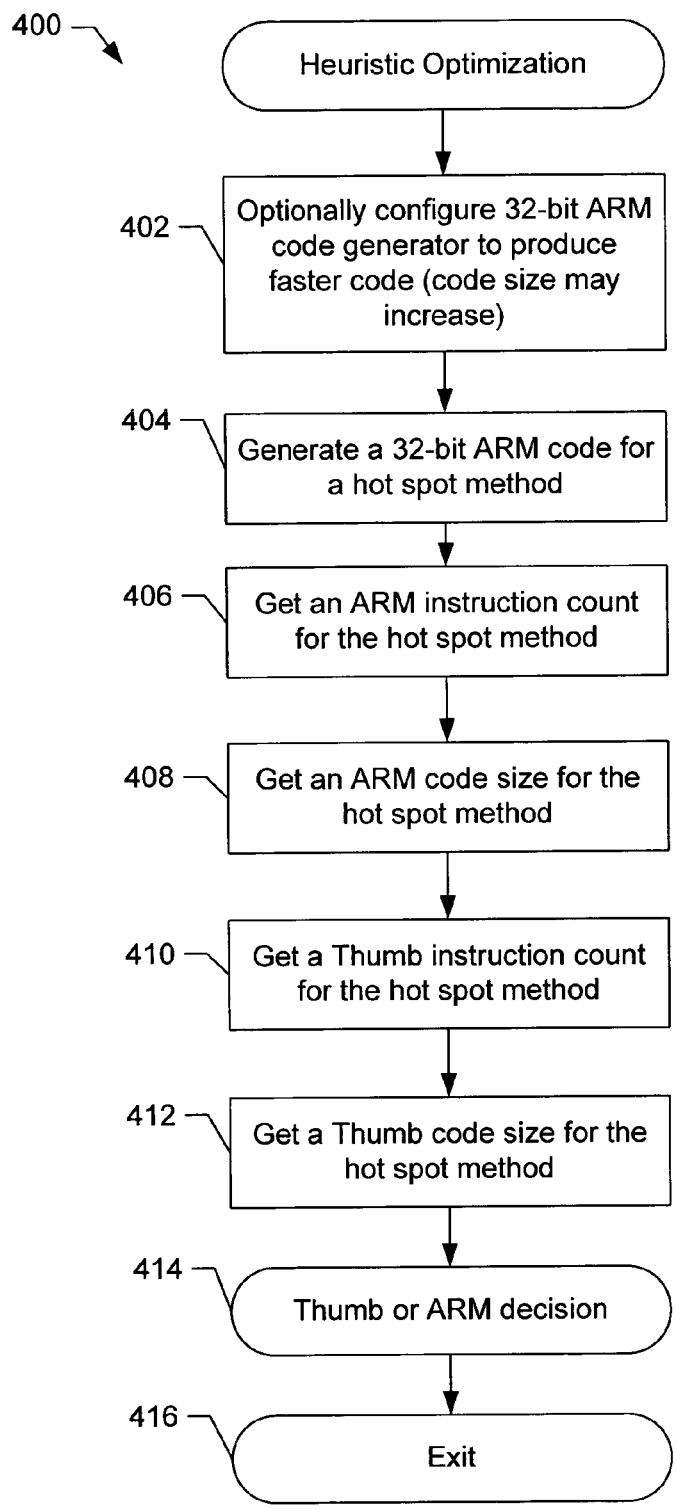
FIG. 4 is a flowchart illustrating an example process for heuristic optimization of mixed mode instructions that may be carried out by the computing system of FIG. 1.

An example process 400 for heuristic optimization is illustrated in FIG. 4. Preferably, the process 400 is embodied in one or more software programs which are stored in one or more memories and executed by one or more processors in a well known manner. However, some or all of the blocks of the process 400 may be performed manually. Although the process 400 is described with reference to the flowchart illustrated in FIG. 4, a person of ordinary skill in the art will readily appreciate that many other methods of performing the process 400 may be used. For example, the order of many of the blocks may be altered, the operation of one or more blocks may be changed, blocks may be combined, and/or blocks may be eliminated.

In general, the example process 400 optimizes the mixed mode instructions on the main processing unit 102 of FIG. 1, although the instructions may have originated from the internet, POTS, and/or other network(s) 118 of FIG. 1, or from the hard drive(s), CD(s), DVD(s), and/or other storage devices 116 of FIG. 1. More specifically, the example process 400 may operate in the JIT compiler 210 of FIG. 2.

Many software applications, such as one or more of the plurality of applications 202 of FIG. 2, spend a majority of the application's time executing a minority of instructions from the compiled binary 206 of FIG. 2. These frequently executed instructions are called hot spots, and the methods in which they are organized are called hot spot methods. Optimization of the hot spot methods increase the performance of the overall system more than optimization of the less frequently executed majority of instructions increases performance of the overall system. Accordingly, it is important to identify the hot spot methods accurately and to optimize the hot spot methods when identified. Identification of the hot spot methods has already been discussed in conjunction with the invocation counter of FIG. 3.

FIG. 4 illustrates the example process 400 in which the hot spot methods may be optimized. The example process 400 begins by optionally configuring the 32-bit ARM code generator 218 of FIG. 2 to produce faster code yet potentially larger code (block 402). Typically the trade off of faster but bigger may be made to increase the speed of hot spot methods (e.g., timing critical methods) possibly resulting in better performance but larger memory size. While the configuration of the 32-bit ARM code generator 218 is explained here as having only two levels, an enabled level and a disabled level, those having ordinary skill in the art realize that various levels of configuration may be defined.

After optionally configuring the 32-bit ARM code generator 218 (block 402), the example process 400 generates a 32-bit ARM code for a hot spot method (block 404). After generating a 32-bit ARM code for a hot spot method (block 404), an ARM instruction count is obtained from the generated 32-bit ARM code for the hot spot method (block 406). For example, the JIT compiler 210 of FIG. 2 may obtain the ARM instruction count by subtracting a memory location containing a last generated 32-bit ARM code instruction from a memory location containing a first generated 32-bit ARM code instruction.

After an ARM instruction count is obtained for the hot spot method (block 406), an ARM code size is obtained for the hot spot method (block 408). The ARM code size is the size of the ARM machine code measured in bytes. The ARM code size may be obtained or estimated, for example, by multiplying the ARM instruction count by four. As will be readily appreciated by those having ordinary skill in the art, the ARM instruction count may be multiplied by four because the ARM instructions are 32-bit in size, which is four octets (i.e. bytes). The ARM code size differs from the ARM instruction count in that the ARM code size measures the number of bytes for a given hot spot method, whereas the ARM instruction count measures the number of instructions. An instruction may comprise multiple bytes.

After an ARM code size is obtained for the hot spot method (block 408), a Thumb instruction count is obtained for the hot spot method (block 410). For example, the JIT compiler 210 of FIG. 2 may obtain the Thumb instruction count by subtracting a memory location containing a last generated 16-bit Thumb code instruction from a memory location containing a first generated 16-bit Thumb code instruction.

After a Thumb instruction count is obtained for the hot spot method (block 410), a Thumb code size is obtained for the hot spot method (block 412). The Thumb code size is the size of the Thumb machine code measured in bytes. The Thumb code size differs from the Thumb instruction count in that the Thumb code size measures the number of bytes for a given hot spot method, whereas the Thumb instruction count measures the number of instructions. The Thumb code size may be obtained or estimated, for example, by multiplying the Thumb instruction count by two. As will be readily appreciated by those having ordinary skill in the art, the Thumb instruction count may be multiplied by two because the Thumb instructions are typically 16-bit in size, which is two octets (i.e. bytes).

After a Thumb code size is obtained for the hot spot method (block 412), a Thumb or ARM decision process is invoked (block 414). The Thumb or ARM decision process is discussed in greater detail in conjunction with FIG. 5. After the Thumb or ARM decision process has completed (block 414), the example process 400 exits (block 416).

Figure 5:
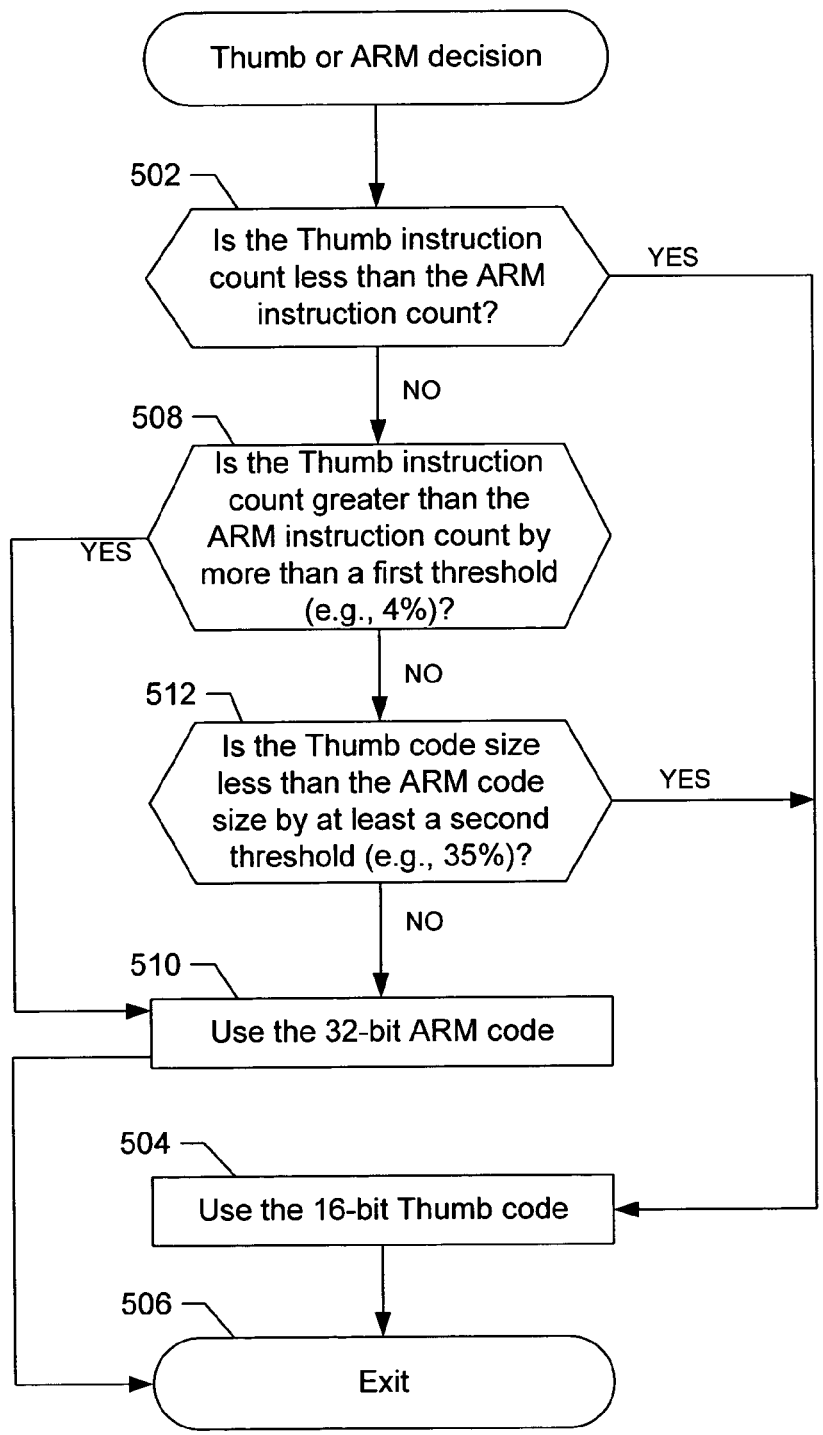
FIG. 5 is a flowchart illustrating an example process for deciding between using 16-bit instructions and 32-bit instructions that may be carried out by the computing system of FIG. 1.

An example process 500 for deciding to use ARM or Thumb instructions is illustrated in FIG. 5. Preferably, the process 500 is embodied in one or more software programs which are stored in one or more memories and executed by one or more processors in a well known manner. However, some or all of the blocks of the process 500 may be performed manually. Although the process 500 is described with reference to the flowchart illustrated in FIG. 5, a person of ordinary skill in the art will readily appreciate that many other methods of performing the process 500 may be used. For example, the order of many of the blocks may be altered, the operation of one or more blocks may be changed, blocks may be combined, and/or blocks may be eliminated.

In general, the example process 500 optimizes the mixed mode instructions on the main processing unit 102 of FIG. 1, although the instructions may have originated from the internet, POTS, and/or other network(s) 118 of FIG. 1 or from the hard drive(s), CD(s), DVD(s), and/or other storage devices 116 of FIG. 1. Additionally, the example process 500 may operate in the JIT compiler 210 of FIG. 2.

The example process 500 begins by determining if the Thumb instruction count is less than the ARM instruction count (block 502). If the Thumb instruction count is less than the ARM instruction count (block 502), the example process 500 determines that the 16-bit Thumb code is the best fit because of its smaller instruction count (block 504). After deciding to use the 16-bit Thumb code (block 504), the example process 500 exits (block 506).

Conversely, if the Thumb instruction count is greater than the ARM instruction count (block 502), the example process 500 determines if the Thumb instruction count is greater than the ARM instruction count by more than a first threshold (block 508). The first threshold may be stored in non-volatile memory, directly in the code space of the system (e.g., the hard drive, CD(s), DVD(s), flash, and/or other storage devices 116 of FIG. 1), transmitted over a communication link, etc. and may be in one of various different formats such as, for example, a percentage number (e.g., 4%), a decimal number, a hexadecimal number, etc.

If the Thumb instruction count is not greater than the ARM instruction count by more than the first threshold (block 508), the example process 500 determines that the 16-bit Thumb code is not significantly smaller in regard to instruction count than the 32-bit ARM code and that the 32-bit ARM is the best fit (block 510). After determining the 32-bit ARM code is the best fit (block 510) the example process 500 exits (block 506).

Conversely, if the Thumb instruction count is greater than the ARM instruction count by more than the first threshold (block 508), the example process 500 determines if the Thumb code size is less than the ARM code size by at least a second threshold (block 512). The second threshold may be stored in non-volatile memory, directly in the code space of the system (e.g., the hard drive, CD(s), DVD(s), flash, and/or other storage devices 116 of FIG. 1), transmitted over a communication link, etc. and may be in one of various different formats such as, for example, a percentage number (e.g., 35%), a decimal number, a hexadecimal number, etc.

If the Thumb code size is less than the ARM code size by at least the second threshold (block 512), the example process 500 determines that the 16-bit Thumb code is the best fit because of its significantly smaller code size (block 504). After the example process 500 decides to use the 16-bit Thumb code (block 504), the example process 500 exits (block 506). Conversely, if the Thumb code size is not less than the ARM code size by at least the second threshold (block 512), the example process 500 determines that the 32-bit ARM code is the best fit (block 510) and exits (block 506).

Although certain methods and apparatus have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of executing a non-native software instruction, the method comprising:
   receiving the non-native software instruction at a device;
   directly compiling the non-native software instruction to generate a first native software instruction from a first instruction set at the device;
   executing the first native software instruction at the device;
   determining a current frequency of execution associated with the first native software instruction by incrementing a counter in response to the execution of the first native software instruction, wherein the current frequency of execution is determined a plurality of times during execution of one or more programs associated with the first native software instruction;
   when the current frequency of execution associated with the first native software instruction exceeds a threshold during the execution of the one or more programs associated with the first native software instruction, directly compiling the non-native software instruction to generate a second native software instruction from a second instruction set at the device, wherein the second instruction set is different from the first instruction set; and
   executing the second native software instruction at the device.

2. A method as defined in claim 1, further comprising inserting instrumentation to count a number of times the first native software instruction is executed.

3. A method as defined in claim 1, further comprising receiving the threshold via a mobile runtime configuration parameter.

4. A method as defined in claim 1, wherein receiving the non-native software instruction at the device comprises receiving an intermediate language instruction at the device.

5. A method as defined in claim 1, wherein receiving the non-native software instruction at the device comprises receiving Java byte code at the device.

6. A method as defined in claim 1, wherein receiving the non-native software instruction at the device comprises wirelessly receiving the non-native software instruction at a handheld computing device.

7. A method as defined in claim 1, wherein the first native software instruction comprises an X-bit wide instruction, the second native software instruction comprises a Y-bit wide instruction, and X is less than Y.

8. A method as defined in claim 1, wherein the first native software instruction comprises a 16-bit wide instruction, and the second native software instruction comprises a 32-bit wide instruction.

9. A method as defined in claim 1, wherein the first native software instruction comprises a Thumb instruction, and the second native software instruction comprises an ARM instruction.

10. A method as defined in claim 1, wherein compiling the non-native software instruction at the device comprises using a just-in-time compiler.

11. A method as defined in claim 1, further comprising:
    configuring a first code optimization option prior to generation of the first native software instruction, the first code optimization option causing smaller code to be generated; and
    configuring a second code optimization option prior to generation of the second native software instruction, the second code optimization option causing faster code to be generated.

12. A method as defined in claim 1, wherein compiling the non-native software instruction to generate the first native software instruction comprises generating a first plurality of native software instructions, and compiling the non-native software instruction to generate the second native software instruction comprises generating a second plurality of native software instructions, the method further comprising:
    counting a first number of instructions contained within the first plurality of native software instructions;
    counting a second number of instructions contained within the second plurality of native software instructions; and
    comparing the first number of instructions and the second number of instructions, wherein executing the first native software instruction is in response to one of (i) the second number of instructions equaling the first number of instructions and (ii) the second number of instructions exceeding the first number of instructions.

13. A method as defined in claim 12, further comprising:
    comparing the first number of instructions and the second number of instructions, wherein executing the second native software instruction is in response to the first number of instructions not exceeding the second number of instructions by more than a predetermined threshold.

14. A method as defined in claim 1, further comprising:
    measuring the first native software instruction resulting in a first number of bytes;
    measuring the second native software instruction resulting in a second number of bytes; and
    comparing the first number of bytes and the second number of bytes, wherein executing the first native software instruction is in response to the first number of bytes being less than the second number of bytes by at least a predetermined threshold.

15. A method as defined in claim 1, further comprising:
    measuring the first native software instruction resulting in a first number of bytes;
    measuring the second native software instruction resulting in a second number of bytes; and
    comparing the first number of bytes and the second number of bytes, wherein executing the second native software instruction is in response to the first number of bytes not being less than the second number of bytes by at least a predetermined threshold.

16. An article of manufacture comprising a machine-accessible storage medium having a plurality of machine accessible instructions that, when executed, cause a device to:
    receive a non-native software instruction at the device;
    directly compile the non-native software instruction to generate a first native software instruction from a first instruction set at the device;
    execute the first native software instruction at the device;
    determine a current frequency of execution associated with the first native software instruction by incrementing a counter in response to the execution of the first native software instruction, wherein the current frequency of execution is determined a plurality of times during execution of one or more programs associated with the first native software instruction;

when the current frequency of execution associated with the first native software instruction exceeds a threshold during the execution of the one or more programs associated with the first native software instruction, directly compile the non-native software instruction to generate a second native software instruction from a second instruction set at the device, wherein the second instruction set is different from the first instruction set; and execute the second native software instruction at the device.

17. A machine-accessible storage medium as defined in claim 16, wherein the plurality of machine accessible instructions are configured to cause the device to insert instrumentation to count a number of times the first native software instruction is executed.

18. A machine-accessible storage medium as defined in claim 16, wherein the non-native software instruction comprises an intermediate language instruction.

19. A machine-accessible storage medium as defined in claim 16, wherein the first native software instruction comprises an X-bit wide instruction, the second native software instruction comprises a Y-bit wide instruction, and X is less than Y.

20. A machine-accessible storage medium as defined in claim 16, wherein the first native software instruction comprises a Thumb instruction, and the second native software instruction comprises an ARM instruction.

21. A machine-accessible storage medium as defined in claim 16, wherein the plurality of machine accessible instructions includes at least a portion of a just-in-time compiler.

22. A machine-accessible storage medium as defined in claim 16, wherein the first native software instruction comprises a first plurality of native software instructions, and the second native software instruction comprises a second plurality of native software instructions, wherein the plurality of machine accessible instructions are configured to cause the device to:

count a first number of instructions contained within the first plurality of native software instructions;

count a second number of instructions contained within the second plurality of native software instructions; and compare the first number of instructions and the second number of instructions, wherein executing the first native software instruction is in response to one of (i) the second number of instructions equaling the first number of instructions and (ii) the second number of instructions exceeding the first number of instructions.

23. A machine-accessible storage medium as defined in claim 22, wherein the plurality of machine accessible instructions are structured to cause the device to:

compare the first number of instructions and the second number of instructions, wherein executing the second native software instruction is in response to the first number of instructions exceeding the second number of instructions by more than a predetermined threshold.

24. A machine-accessible storage medium as defined in claim 16, wherein the plurality of machine accessible instructions are structured to cause the device to:

measure the first native software instruction resulting in a first number of bytes;

measure the second native software instruction resulting in a second number of bytes; and compare the first number of bytes and the second number of bytes, wherein executing the first native software instruction is in response to the first number of bytes being less than the second number of bytes by at least a predetermined threshold.

25. A machine-accessible storage medium as defined in claim 16, wherein the plurality of machine accessible instructions are structured to cause the device to:

measure the first native software instruction resulting in a first number of bytes;

measure the second native software instruction resulting in a second number of bytes; and compare the first number of bytes and the second number of bytes, wherein executing the second native software instruction is in response to the first number of bytes not being less than the second number of bytes by at least a predetermined threshold.

26. An apparatus structured to execute a mixed mode code, the apparatus comprising:

a memory device; and a mixed mode processor operatively coupled to the memory device, the mixed mode processor being structured to execute a runtime environment, the runtime environment being stored in the memory device, the runtime environment comprising:

a compiled binary comprising a plurality of non-native instructions;

a first code generator to compile at least one of the non-native instructions to generate a first native software instruction, the first native software instruction being associated with a first instruction set of the mixed mode processor;

a counter to be incremented in response to the execution of the first native software instruction to determine a current frequency of execution associated with the first native software instruction, wherein the current frequency of execution is determined a plurality of times during execution of one or more programs associated with the first native software instruction;

a second code generator to compile at least one of the non-native instructions to generate a second native software instruction when the current frequency of execution associated with the first native software instruction exceeds a threshold during the execution of the one or more programs associated with the first native software instruction, the second native software instruction being associated with a second instruction set of the mixed mode processor, wherein the first instruction set is different than the second instruction set; and an executing code including the first instruction and the second instruction.

27. An apparatus as defined in claim 26, wherein the first instruction set comprises an X-bit wide instruction set, the second instruction set comprises a Y-bit wide instruction set, and X is less than Y.

28. An apparatus as defined in claim 26, wherein the first instruction set comprises a 16-bit wide instruction set, and the second instruction set comprises a 32-bit wide instruction set.

* * * * *